US005177681A

United States Patent [19]

Sato

[11] Patent Number: 5,177,681

[45] Date of Patent: Jan. 5, 1993

[54] ROLL CONTROL SYSTEM IN VEHICLE ADMISSIVE OF COUNTER STEERING

[75] Inventor: Shinsuke Sato, Susono, Japan

[73] Assignee: Toyota Jidosha Kabushiki Kaisha, Aichi, Japan

[21] Appl. No.: 660,854

[22] Filed: Feb. 26, 1991

[30] Foreign Application Priority Data

Apr. 27, 1990 [JP] Japan ................................ 2-112926

[51] Int. Cl.[5] ............................................ B60G 21/00

[52] U.S. Cl. .............................. 364/424.05; 280/707

[58] Field of Search ...................... 364/424.01, 424.05, 364/426.02; 280/707, 689, 840

[56] References Cited

U.S. PATENT DOCUMENTS 4,717,173 1/1988 Sugasawa et al. .................. 280/707
4,730,843 3/1988 Tanaka et al. ...................... 280/707
4,789,935 12/1988 Buma et al. .................... 364/424.05
4,803,627 2/1989 Yasuike et al. ................ 364/424.05
4,809,176 2/1989 Oowa et al. .................... 364/424.05
4,848,790 7/1989 Fukunaga et al. .................. 280/707
4,852,903 8/1989 Tanaka et al. ...................... 280/689
4,853,860 8/1989 Achenbach ................... 364/424.05
4,865,347 9/1989 Fukushima et al. ................ 280/707
4,958,850 9/1990 Buma et al. ......................... 280/714
4,971,353 11/1990 Buma et al. ......................... 280/707
4,973,080 11/1990 Ikemoto et al. ..................... 280/707
4,979,115 12/1990 Takahashi ...................... 364/424.05
4,999,777 3/1991 Schussler et al. ............. 364/424.05
5,013,062 5/1991 Yonekawa et al. ................. 280/707
5,042,834 8/1991 Yonekawa et al. ................. 280/707
5,043,893 8/1991 Aburaya et al. ............... 364/424.05
5,044,660 9/1991 Yamamura et al. ................ 280/707
5,069,475 12/1991 Yonekawa et al. ................. 280/707
5,071,158 12/1991 Yonekawa et al. ................ 280/707
5,098,263 3/1992 Hattori et al. ...................... 417/540
5,104,143 4/1992 Yonekawa .......................... 280/707

FOREIGN PATENT DOCUMENTS 114757 8/1984 European Pat. Off. .
61-81212 4/1986 Japan .
61-218414 9/1986 Japan .
62-198509 9/1987 Japan .
63-106133 5/1988 Japan .
63-106127 11/1988 Japan .
1-197109 8/1989 Japan .
2-38122 2/1990 Japan .
63307189 6/1990 Japan .
63307190 6/1990 Japan .

*Primary Examiner*—Thomas G. Black
*Assistant Examiner*—Michael Zanelli
*Attorney, Agent, or Firm*—Oliff & Berridge

[57] ABSTRACT

In a roll control system in a vehicle adapted to suppress the rolling of the vehicle body along with an increase of the rate of change of the lateral acceleration of the vehicle body estimated from vehicle speed and steering angle velocity, a side sliding of the vehicle relative to the road surface is detected, and if the steering angle is opposite to the turning direction of the vehicle when a side sliding is detected, the roll suppressing operation of the roll control system is attenuated to avoid an augmentation of the rolling by the roll control.

4 Claims, 10 Drawing Sheets

Ibi

Pi

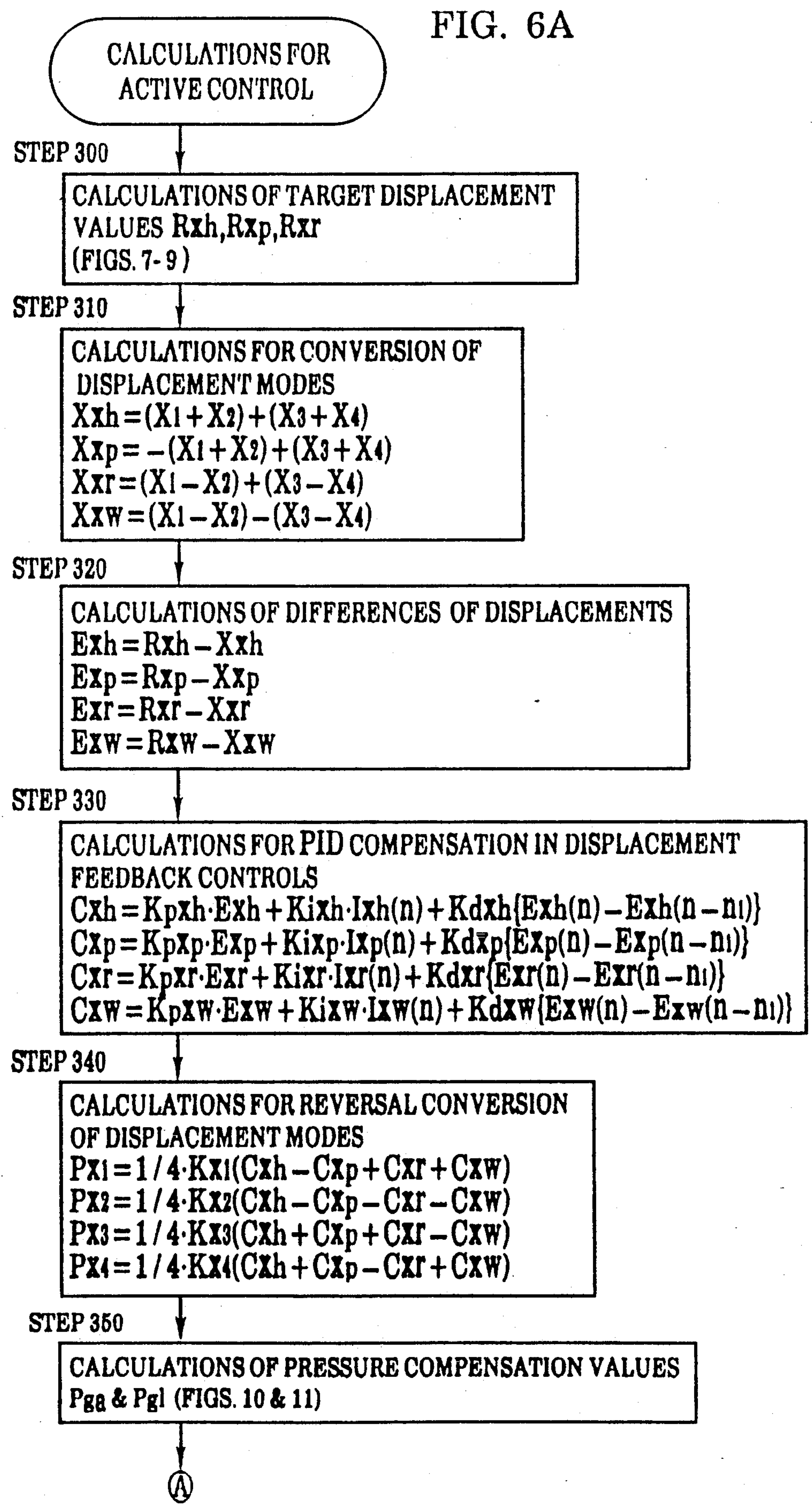
FIG. 6A
CALCULATIONS FOR ACTIVE CONTROL
STEP 300
CALCULATIONS OF TARGET DISPLACEMENT VALUES Rxh,Rxp,Rxr (FIGS. 7-9)
STEP 310
CALCULATIONS FOR CONVERSION OF DISPLACEMENT MODES
Xxh=(X1+X2)+(X3+X4)
Xxp=-(X1+X2)+(X3+X4)
Xxr=(X1-X2)+(X3-X4)
Xxw=(X1-X2)-(X3-X4)
STEP 320
CALCULATIONS OF DIFFERENCES OF DISPLACEMENTS
Exh=Rxh-Xxh
Exp=Rxp-Xxp
Exr=Rxr-Xxr
Exw=Rxw-Xxw
STEP 330
CALCULATIONS FOR PID COMPENSATION IN DISPLACEMENT FEEDBACK CONTROLS
Cxh=Kpxh·Exh+Kixh·Ixh(n)+Kdxh{Exh(n)-Exh(n-n1)}
Cxp=Kpxp·Exp+Kixp·Ixp(n)+Kdxp{Exp(n)-Exp(n-n1)}
Cxr=Kpxr·Exr+Kixr·Ixr(n)+Kdxr{Exr(n)-Exr(n-n1)}
Cxw=Kpxw·Exw+Kixw·Ixw(n)+Kdxw{Exw(n)-Exw(n-n1)}
STEP 340
CALCULATIONS FOR REVERSAL CONVERSION OF DISPLACEMENT MODES
Px1=1/4·Kx1(Cxh-Cxp+Cxr+Cxw)
Px2=1/4·Kx2(Cxh-Cxp-Cxr-Cxw)
Px3=1/4·Kx3(Cxh+Cxp+Cxr-Cxw)
Px4=1/4·Kx4(Cxh+Cxp-Cxr+Cxw)
STEP 350
CALCULATIONS OF PRESSURE COMPENSATION VALUES Pga & Pgl (FIGS. 10 & 11)
A

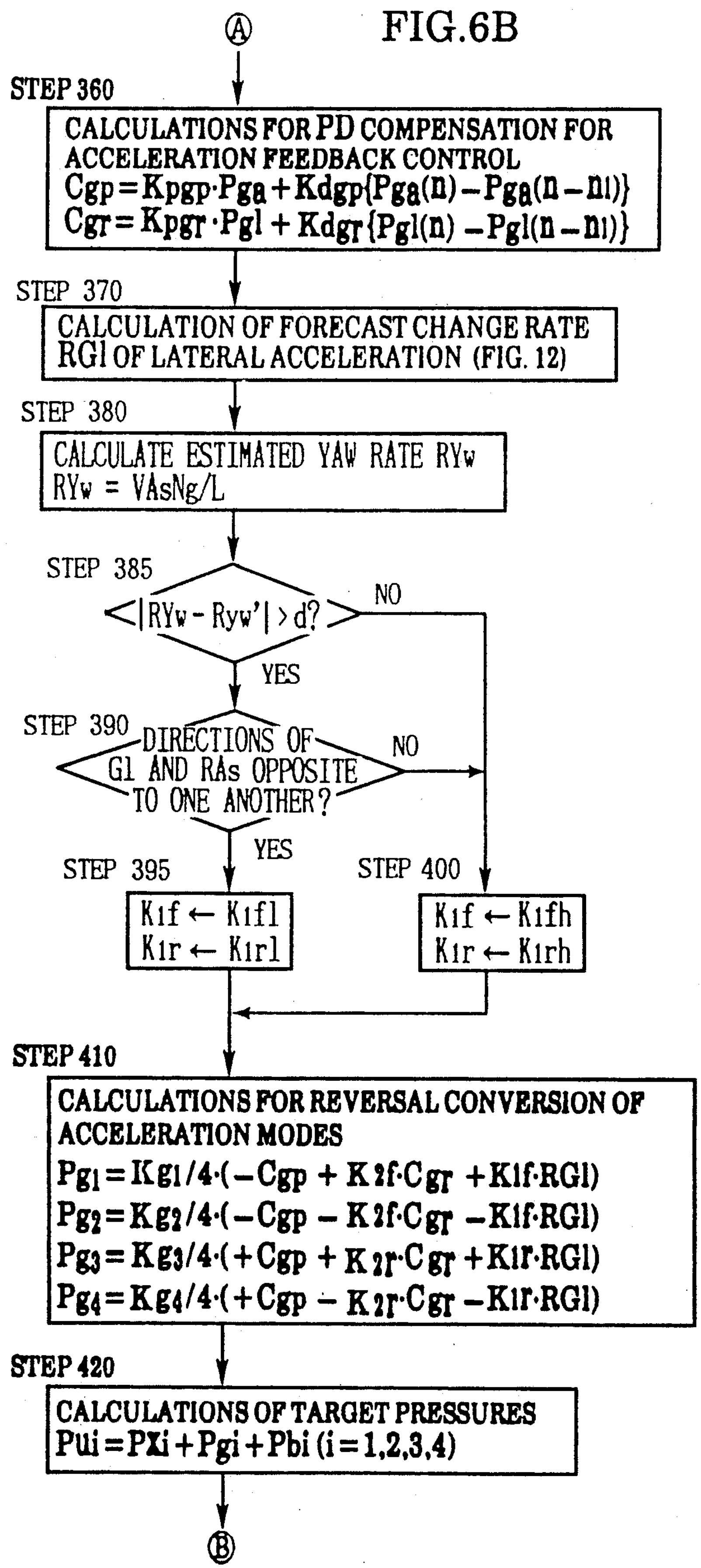

FIG.6B
A
STEP 360
CALCULATIONS FOR PD COMPENSATION FOR ACCELERATION FEEDBACK CONTROL
Cgp = Kpgp·Pga + Kdgp{Pga(n) − Pga(n − n1)}
Cgr = Kpgr·Pgl + Kdgr{Pgl(n) − Pgl(n − n1)}
STEP 370
CALCULATION OF FORECAST CHANGE RATE RGl OF LATERAL ACCELERATION (FIG. 12)
STEP 380
CALCULATE ESTIMATED YAW RATE RYw
RYw = VAsNg/L
STEP 385
|RYw − Ryw'| > d?
NO
YES
STEP 390
DIRECTIONS OF Gl AND RAs OPPOSITE TO ONE ANOTHER?
NO
YES
STEP 395
K1f ← K1fl
K1r ← K1rl
STEP 400
K1f ← K1fh
K1r ← K1rh
STEP 410
CALCULATIONS FOR REVERSAL CONVERSION OF ACCELERATION MODES
Pg1 = Kg1/4·(−Cgp + K2f·Cgr + K1f·RGl)
Pg2 = Kg2/4·(−Cgp − K2f·Cgr − K1f·RGl)
Pg3 = Kg3/4·(+Cgp + K2r·Cgr + K1r·RGl)
Pg4 = Kg4/4·(+Cgp − K2r·Cgr − K1r·RGl)
STEP 420
CALCULATIONS OF TARGET PRESSURES
Pui = PXi + Pgi + Pbi (i = 1,2,3,4)
B

Figure 6C:
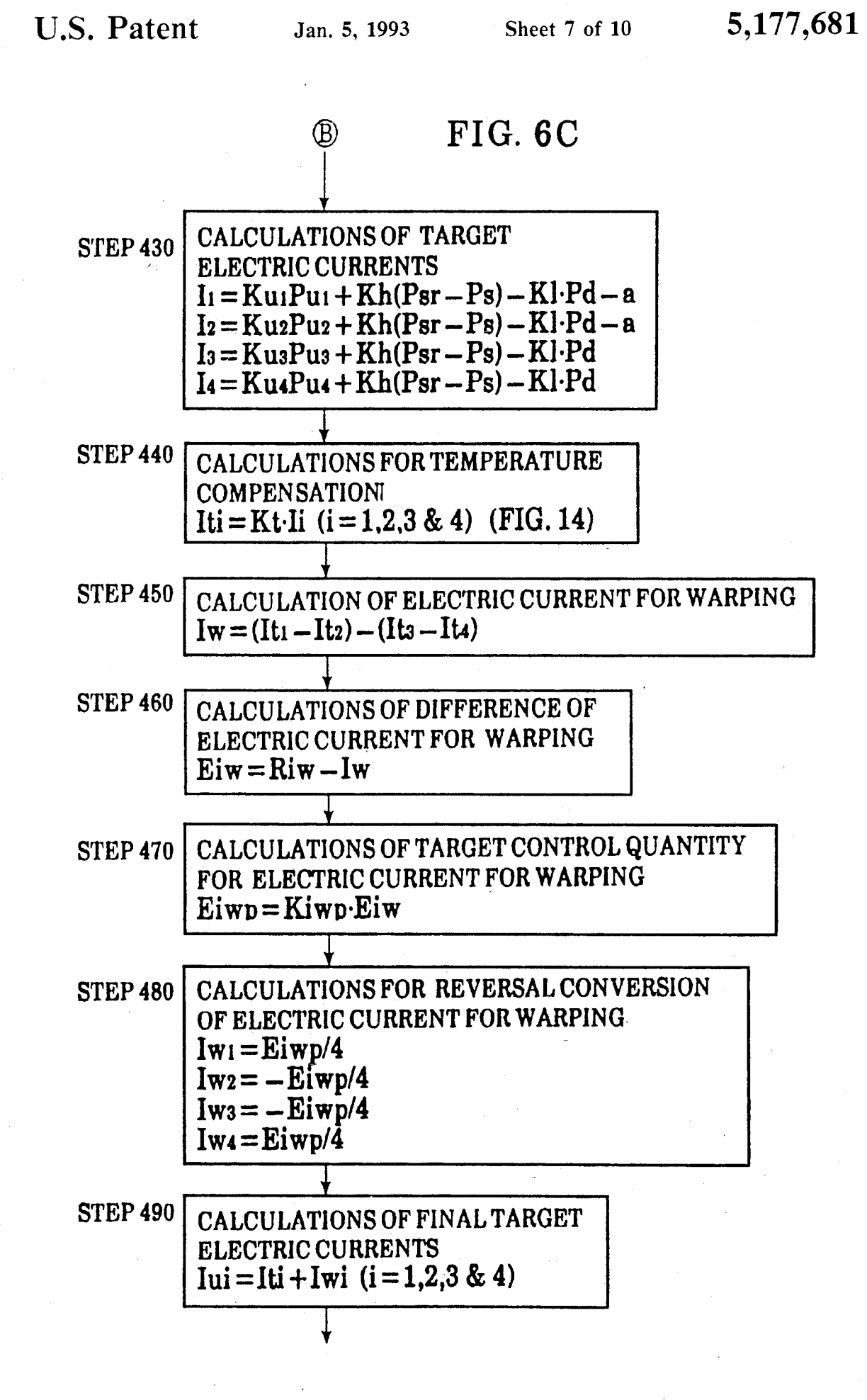

STEP 430

CALCULATIONS OF TARGET ELECTRIC CURRENTS $I_1 = K_{u1}P_{u1} + Kh(Psr - Ps) - Kl \cdot Pd - a$ $I_2 = K_{u2}P_{u2} + Kh(Psr - Ps) - Kl \cdot Pd - a$ $I_3 = K_{u3}P_{u3} + Kh(Psr - Ps) - Kl \cdot Pd$ $I_4 = K_{u4}P_{u4} + Kh(Psr - Ps) - Kl \cdot Pd$

STEP 440

CALCULATIONS FOR TEMPERATURE COMPENSATION $Iti = Kt \cdot Ii$ ($i = 1,2,3$ & $4$) (FIG. 14)

STEP 450

CALCULATION OF ELECTRIC CURRENT FOR WARPING $Iw = (It_1 - It_2) - (It_3 - It_4)$

STEP 460

CALCULATIONS OF DIFFERENCE OF ELECTRIC CURRENT FOR WARPING $Eiw = Riw - Iw$

STEP 470

CALCULATIONS OF TARGET CONTROL QUANTITY FOR ELECTRIC CURRENT FOR WARPING $Eiw_D = Kiw_D \cdot Eiw$

STEP 480

CALCULATIONS FOR REVERSAL CONVERSION OF ELECTRIC CURRENT FOR WARPING $Iw_1 = Eiwp/4$ $Iw_2 = -Eiwp/4$ $Iw_3 = -Eiwp/4$ $Iw_4 = Eiwp/4$

STEP 490

CALCULATIONS OF FINAL TARGET ELECTRIC CURRENTS $Iui = Iti + Iwi$ ($i = 1,2,3$ & $4$)

ROLL CONTROL SYSTEM IN VEHICLE ADMISSIVE OF COUNTER STEERING

BACKGROUND OF THE INVENTION

1. Field of the Invention

The present invention relates to a roll control system in a vehicle such as an automobile, and more particularly, to an improvement of a roll control system which controls the rolling of the vehicle body based upon the rate of change of an estimated lateral acceleration with reference to the steering angle.

2. Description of the Prior Art

A roll control system in a vehicle such as an automobile is known as being adapted to control the roll stiffness of the vehicle in its quick turning as based not only upon the lateral acceleration as in normal turning but also upon the rate of change of an estimated lateral acceleration obtained from vehicle speed and steering angle velocity, in order to improve the responsiveness of the roll control, as described, for example, in Japanese Patent Laid-open Publication 61-81212.

On the other hand, it is well known in the art of car driving that, when the vehicle has drifted, i.e. when the rear part of the vehicle has made a side sliding toward the outside of the turn during a turning of the vehicle on a slippery road, the so-called counter steering, that is to steer the vehicle to the direction opposite to the turning, is sometimes effective in order to correct the running direction of the vehicle. However, when such counter steering is done while the vehicle is running under the roll control operating based upon the rate of change of a lateral acceleration estimated from vehicle speed and steering angle velocity, since the direction of turning of the vehicle and that of turning the steering wheel are opposite to one another, the rolling control will rather augment the rolling of the vehicle body.

SUMMARY OF THE INVENTION

In view of the above-mentioned problem in such a type of conventional roll control system, it is an object of the present invention to provide an improved roll control system according to which the rolling of the vehicle body is not augmented even when the counter steering is done against a side sliding of the vehicle during its turning.

According to the present invention, the above-mentioned object is accomplished by a roll control system in a vehicle, comprising a means for detecting a side sliding of a vehicle relative to a road surface in steering of the vehicle, a means for detecting or estimating lateral acceleration of a vehicle body, a means for estimating rate of change of the lateral acceleration of the vehicle body from vehicle speed and steering angle, a means for detecting direction of steering, a roll stiffness control means for controlling stiffness against rolling of the vehicle body at front or rear wheels, and a means for controlling said roll stiffness control means based upon the estimated rate of change of the lateral acceleration so as to increase the stiffness against rolling of the vehicle body along with an increase of the estimated rate of change of the lateral acceleration, wherein said means for controlling said roll stiffness control means is adapted to attenuate said increase of the stiffness against rolling of the vehicle body when the side sliding is detected while the directions of the lateral acceleration and the steering are opposite to one another.

As the amount of increase of the roll stiffness provided by the roll stiffness control means along with increase of the rate of change of the estimated lateral acceleration is attenuated when the side sliding of the vehicle is detected while the directions of the lateral acceleration of the steering are opposite to one another, it is definitely avoided that the roll stiffness control based upon a reference to the steering angle adversely affects the roll control so as to augment the rolling of the vehicle body.

The roll stiffness control means in the roll control system according to the present invention may be any means if it is capable of changing the roll stiffness at the front or rear wheels. For example, an active suspension adapted to be able to control the load of suspension at each wheel or an active stabilizer adapted to be able to variably control the roll stiffness is employable.

BRIEF DESCRIPTION OF THE DRAWINGS

In the accompanying drawings,

FIGS. 6A through 6C are flowcharts showing the subroutine calculations for the active control carried out in step 110 in the flowchart shown in FIG. 3;

DESCRIPTION OF THE PREFERRED EMBODIMENT

In the following the present invention will be described with respect to an embodiment with reference to the accompanying drawings.

Figure 1:
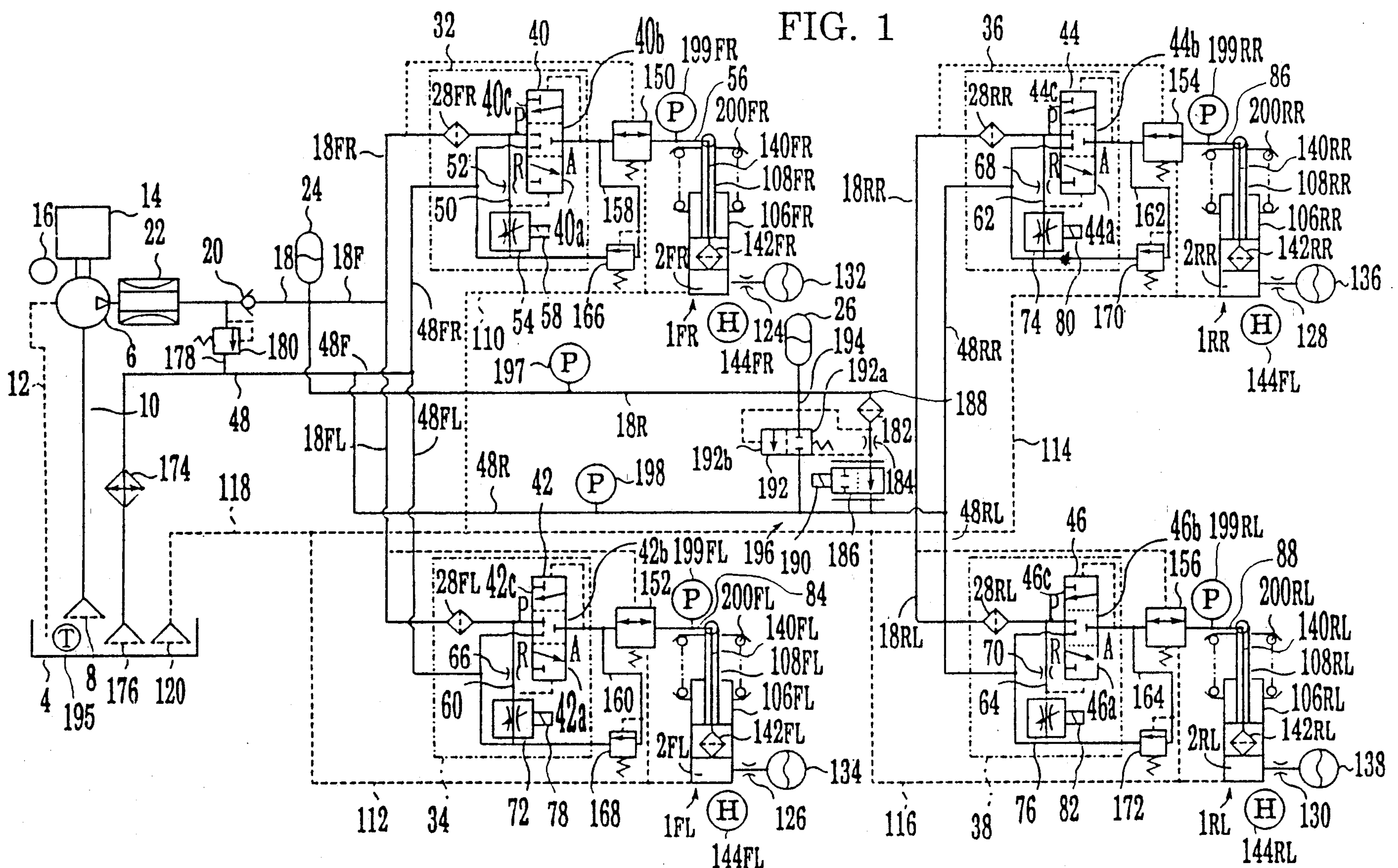
FIG. 1 is a diagrammatic illustration of a fluid pressure circuit of an embodiment of the roll control system according to the present invention employing a fluid pressure type active suspension as a means for controlling the roll stiffness.

Referring to FIG. 1 showing the fluid circuits of an embodiment of the roll control device according to the present invention which employs a fluid pressure type active suspension as a means for controlling the roll stiffness, the fluid circuit shown in this figure includes actuators 1FR, 1FL, 1RR and 1RL provided for front right, front left, rear right and rear left vehicle wheels, not shown, respectively. These actuators have therein working fluid chambers 2FR, 2FL, 2RR, and 2RL, respectively.

In the figure, 4 designates a reserve tank which contains oil serving as the working fluid, and the tank 4 is connected to the suction side of a pump 6 by a suction line 10 having therein a filter 8 for removing foreign materials from the oil. The pump 6 is connected to a drain line 12 which collects the oil leaked in the pump and returns it to the reserve tank 4. The pump 6 is drivingly connected with and rotationally driven by an engine 14, the rotational speed of which is detected by a rotational speed sensor 16.

A high pressure line 18 is connected with the discharge side of the pump 6. A check valve 20 is incorporated in the high pressure line 18 so as to permit only the flow of oil in the direction from the pump toward the actuators, and between the pump 6 and the check valve 20 is provided an attenuator 22 which serves to absorb or dampen the pressure pulsation of the oil discharged from the pump, thereby reducing the pressure variation. The high pressure line 18 is connected with one end of each of a high pressure line 18F for the front vehicle wheels and a high pressure line 18R for the rear vehicle wheels, with which are connected accumulators 24 and 26, respectively. These accumulators contain therein pressurized gas and serve to absorb pressure variation of the oil and to accumulate pressure. A high pressure line 18FR for the front right vehicle wheel and a high pressure line 18FL for the front left vehicle wheel are each connected at one end thereof with the high pressure line 18F, while a high pressure line 18RR for the rear right vehicle wheel and a high pressure line 18RL for the rear left vehicle wheel are each connected at one end thereof with the high pressure line 18R. The high pressure lines 18FR, 18FL, 18RR and 18RL have therein filters 28FR, 28FL, 28RR and 28RL, respectively, and are connected at their other ends with ports P of pilot-operated three-port switching control valves 40, 42, 44 and 46 included in pressure control means 32, 34, 36 and 38, respectively.

The pressure control means 32 comprises the switching control valve 40, a line 50 for connecting the high pressure line 18FR with a low pressure line 48FR for the front right vehicle wheel, a fixed throttle means 52 and a variable throttle means 54 both provided in the line 50. The switching control valve 40 has, in addition to the port P, ports R and A connected with a low pressure line 48FR and a connection line 56, respectively. The switching control valve 40 may be a spool type valve adapted to be switched over by a pilot pressure Pp taken from the line 50 at a portion between the throttle means 52 and 54 and a pressure Pa taken from the connection line 56 to a switching position 40*a* where it communicates the port P with the port A when the pressure Pp is substantially higher than the pressure Pa; a switching position 40*b* where it interrupts communication among all the ports when the pressure Pp is substantially equal to Pa; and a shifting position 40*c* where it communicates the port R with the port A when the pressure Pp is substantially lower than the pressure Pa. The variable throttle means 54 is adapted to vary its effective flow area by the electric current supplied to its solenoid 58 being controlled and to cooperate with the fixed throttle means 52 to variably control the pilot pressure Pp.

Similarly, the pressure control means 34, 36 and 38 comprise pilot-operated, three-port switching control valves 42, 44 and 46 corresponding to the valve 40, lines 60, 62 and 64 corresponding to the line 50, fixed throttle means 66, 68 and 70 corresponding to the throttle means 52, and variable throttle means 72, 74 and 76 corresponding to the variable throttle means 54, respectively. The variable throttle means 72, 74 and 76 have solenoids 78, 80 and 82, respectively, corresponding to the solenoid 58.

The switching control valves 42, 44 and 46 have the same construction as the switching valve 40, and have the ports R connected with one end of a low pressure line 48FL for the front left vehicle wheel, a low pressure line 48RR for the rear right vehicle wheel, and a low pressure line 48RL for the rear left vehicle wheel, respectively, and the ports A connected with one end of connection lines 84, 86 and 88, respectively. The switching control valves 42, 44 and 46 are spool type valves adapted to take in as pilot pressures therefor the pressures Pp in the associated lines 60, 62 and 64 between the associated fixed and the variable throttling means and the pressures Pa in the associated lines 84, 86 and 88, and to be shifted to switching positions 42*a*, 44*a* and 46*a*, respectively, where they communicate the ports P with the ports A when the pressures Pp are substantially higher than the pressures Pa; shifting positions 42*b*, 44*b* and 46*b* where they interrupt communications among all the ports when the pressures Pp are substantially equal to the pressures Pa; and shifting positions 42*c*, 44*c* and 46*c* where they communicate the ports R with the ports A when the pressures Pp are substantially lower than the pressures Pa.

As shown schematically in FIG. 1, the actuators 1FR, 1FL, 1RR and 1RL include cylinders 106FR, 106FL, 106RR and 106RL and pistons 108FR, 108FL, 108RR and 108RL reciprocably inserted into the associated cylinders, defining working fluid chambers 2FR, 2FL, 2RR and 2RL, respectively. While in the shown embodiment the actuators are located between a vehicle body, not shown, and associated suspension arms, also not shown, with each cylinder being coupled to the associated suspension arm and the upper end of the rod portion of each piston being coupled to the vehicle body, each cylinder may be coupled to the vehicle body while each piston may be coupled the associated suspension arm. Drain lines 110, 112, 114 and 116 are connected at each one end with the cylinders 106FR, 106FL, 106RR and 106RL of the actuators, respectively. The other ends of the drain lines 110, 112, 114 and 116 are connected with a drain line 118 which in turn is connected with the reserve tank 4 by way of a filter 120 so that the oil leaked from the working fluid chambers may be returned to the tank.

Accumulators 132, 134, 136 and 138 are connected to the working fluid chambers 2FR, 2FL, 2RR and 2RL by way of throttle means 124, 126, 128 and 130, respectively, serving as hydropneumatic springs. The pistons 108FR, 108FL, 108RR and 108RL have therein passages 140FR, 140FL, 140RR and 140RL, respectively. These passages connect the associated lines 56, 84, 86 and 88 with the associated working fluid chambers 2FR, 2FL, 2RR and 2RL, respectively, and have therein filters 142FR, 142FL, 142RR and 142RL, respectively. Adjacent the actuators 1FR, 1FL, 1RR and 1RL are installed vehicle height sensors 144FR, 144FL, 144RR and 144RL, respectively, for detecting vehicle heights corresponding to the associated vehicle wheels.

The lines 56, 84, 86 and 88 have therein pilot-operated cut-off valves 150, 152, 154 and 156, respectively, which are in closed conditions whenever the pressure differences between the pressures in the high pressure lines 18FR, 18FL, 18RR and 18RL upstream of the associated pressure control valves 40, 42, 44 and 46, respectively, and the pressures in the drain lines 110, 112, 114 and 116, respectively, are not more than respective predetermined values. The lines 56, 84, 86 and 88 are, at portions thereof between the associated pressure control valves and the cut-off valves, connected with the line 50, 60, 62 and 64 on the downstream side of the associated variable throttle means by lines 158, 160, 162 and 164, respectively, which have therein relief valves 166, 168, 170 and 172, respectively, adapted to take in as pilot pressures therefor the pressures in the associated lines 158, 160, 162 and 164, respectively, on the upstream side thereof, and to open when the pilot pressures exceed respective predetermined values so as thereby to conduct certain amount of oil in the connection lines to the lines 50, 60, 62 and 64, respectively.

The cut-off valves 150, 152, 154 and 156 may be adapted to remain closed whenever the differences between the pressures in the high pressure lines 18FR, 18FL, 18RR and 18RL and the atmospheric pressure are not more than respective predetermined values.

The lines 48FR and 48FL are connected at their other ends with one end of a low pressure line 48F for the front vehicle wheels, while the lines 48RR and 48RL are connected at their other ends with one end of a low pressure line 48R for the rear vehicle wheels. The lines 48F and 48R are connected at their other ends with one end of a low pressure line 48. The line 48 has therein an oil cooler 174 and is connected at the other end with the reserve tank 4 by way of a filter 176. The high pressure line 18 is, at a portion thereof between the check valve 20 and the attenuator 22, connected with the low pressure line 48 by a line 178. The line 178 has therein a relief valve 180 adapted to open when its pilot pressure is higher than a predetermined value.

The high pressure line 18R and the low pressure line 48R are connected with each other by a line 188 which has therein a filter 182, a throttle means 184 and a normally open type electromagnetic on-off valve 186 including a solenoid 190 for controlling the valve opening. The on-off valve 186 is adapted to open when its solenoid 190 is energized and to control the flow rate of the oil flowing therethrough according to control of the energizing electric current supplied thereto. The high pressure line 18R and the low pressure line 48R are further connected with each other by a line 194 having therein a pilot-operated on-off valve 192. The on-off valve 192 is adapted to take in as a pilot pressure therefor the pressures on opposite sides of the throttle means 184 and to remain in its closed position 192*a* when no substantial pressure difference exists between the pressures on opposite sides of the throttle means 184 and to be switched over to its open position 192*b* when the pressure difference across the throttle means 184 is higher than a predetermined value. Thus, the throttle means 184, the electromagnetic on-off valve 186 and the on-off valve 192 cooperate with each other to define a bypass means 196 which selectively communicates the high pressure line 18R with the pressure flow line 48R while controlling the flow rate of the oil flowing from the high pressure line to the low pressure line.

Further in the shown embodiment, a pressure sensor 197 is connected to the high pressure line 18R for detecting the oil pressure Ps therein and similarly a pressure sensor 198 is connected to the low pressure line 48R for detecting the oil pressure Pd therein. Pressure sensors 199FR, 199RL, 199RR and 199RL are connected to the connection lines 56, 84, 86 and 88 for detecting the oil pressure in the working fluid chambers 2FR, 2RL, 2RR and 2RL, respectively. A temperature sensor 195 is provided in the reserve tank 4 for detecting the temperature T of the oil in the tank.

Figure 2:
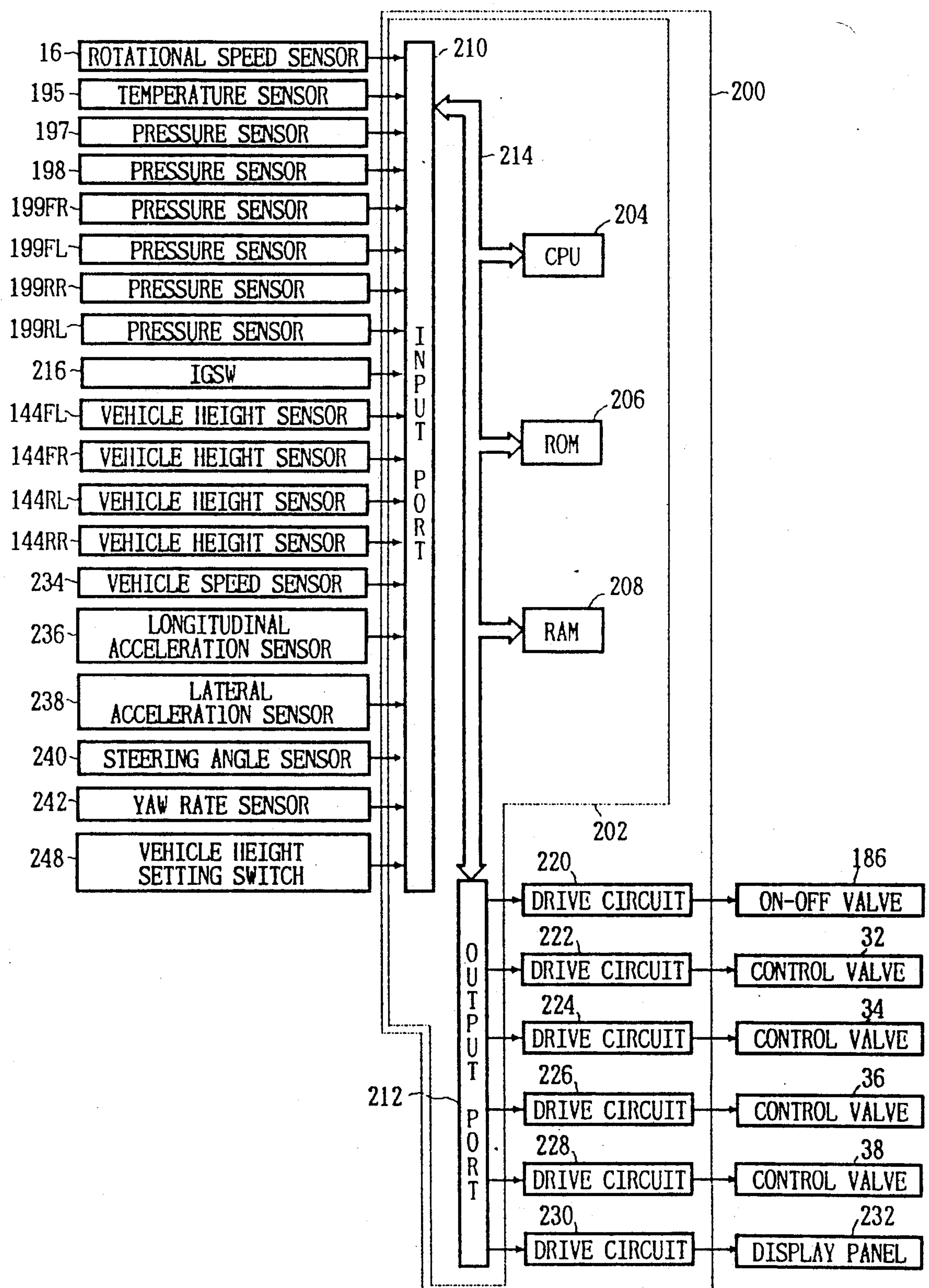
FIG. 2 is a block diagram showing an electric control device in the embodiment shown in FIG. 1.

The electromagnetic on-off valve 186 and the pressure control means 32, 34, 36 and 38 are controlled by an electric control device 200 shown in FIG. 2. The electric control device 200 includes a microcomputer 202. The microcomputer 202 may, as shown in FIG. 2, be of a conventional construction having a central processing unit (CPU) 204, a read only memory (ROM) 206, a random access memory (RAM) 208, an input port device 210, and an output port device 212, all of these interconnected with each other by a two way common bus 214.

The input port device 210 is supplied with a signal indicative of the rotational speed N of the engine 14 from the rotational speed sensor 16, a signal indicative of the temperature T of the oil from the temperature sensor 195, signals indicative of the pressures Ps and Pd within the high pressure and the low pressure lines from the pressure sensors 197 and 198, respectively, signals indicative of the pressures Pi (here "i" is "1" for the front left wheel, "2" for the front right wheel, "3" for the rear left wheel, and "4" for the rear right wheel) in the working fluid chambers 2FL, 2FR, 2RL and 2RR from the pressure sensors 199FL, 199FR, 199RL and 199RR, respectively, a signal indicative of whether or not an ignition switch (IGSW) 216 is on from the ignition switch, and signals indicative of the vehicle heights Xi (i=1, 2, 3 and 4) corresponding to the front left wheel, the front right wheel, the rear left wheel, and the rear right wheel from the vehicle height sensors 144FL, 144FR, 144RL and 144RR, respectively.

Further, the input port device 210 is supplied with a signal indicative of a vehicle speed V from a vehicle speed sensor 234, a signal indicative of a longitudinal acceleration Ga from a longitudinal acceleration sensor 236, a signal indicative of a lateral acceleration G1 from a lateral acceleration sensor 238, a signal indicative of a steering angle As from a steering angle sensor 240, a signal indicative of a yaw rate RYw from a yaw rate sensor 242, and a signal indicative of whether the mode Hset for controlling the vehicle height set by a vehicle height setting switch 248 is a high mode Hh or a normal mode Hn. The switch 248 is provided in the cabin to be operated by a driver or a passenger according to his taste.

The input port device 210 processes the signals input thereto in a predetermined manner, under the control of the CPU 204 which is based upon the program stored in the ROM 206, and outputs the processed signals to the CPU and the RAM 208. The ROM 206 stores the control flows shown in FIG. 3 and FIGS. 6A through 6C and the maps shown in FIGS. 4 and 5 and FIGS. 7 through 13. The output port device 212 outputs, under the control of the CPU 204, a control signal via drive circuit 220 to the electromagnetic on-off valve 186, control signals via drive circuits 222, 224, 226 and 228 to the pressure control means 32, 34, 36 and 38, or more exactly, to the solenoids 58, 78, 80 and 82 in the variable throttle means 54, 72, 74 and 76, respectively, and a control signal via a drive circuit 230 to a display panel 232.

Referring now to the flowchart shown in FIG. 3, the operation of the embodiment will be explained.

Figure 3:
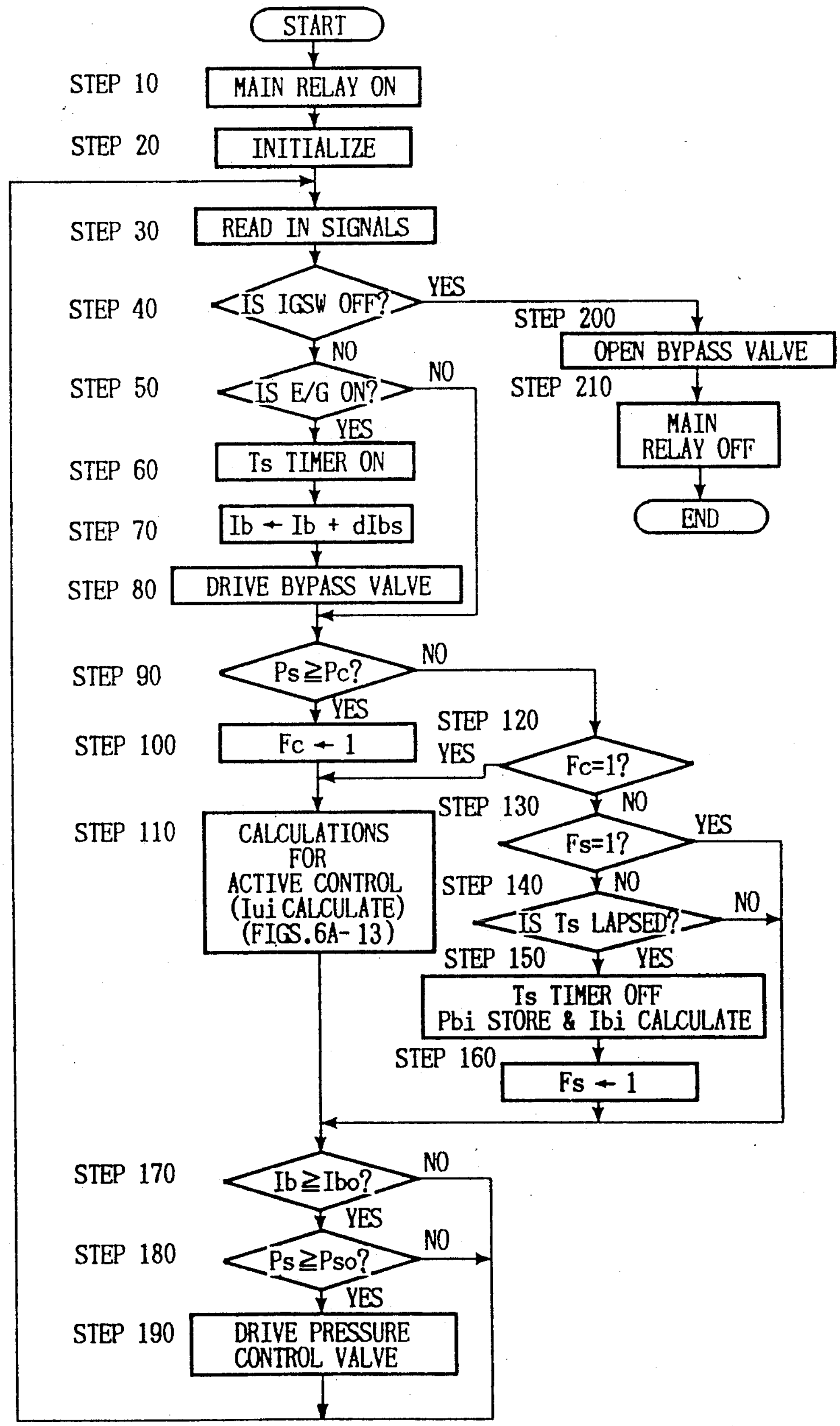
FIG. 3 is a flowchart showing a flow of control carried out by the electric control system shown in FIG. 2.

In this connection, it is to be noted that the routine of the control flow shown in FIG. 3 is initiated when the ignition switch 216 is turned on. It should also be noted that in the flowchart shown in FIG. 3, a flag Fc relates to whether or not the pressure Ps of the oil within the high pressure line has ever exceeded a threshold pressure Pc above which the cut-off valves 152, 150, 156 and 154 are completely opened and that Fc=1 means that the pressure Ps has ever exceeded the pressure Pc, and a flag Fs relates to whether or not standby pressures Pbi (i=1, 2, 3 and 4) referred to later have been set for the pressure control valves 34, 32, 38 and 36, and that Fs=1 means that the standby pressures have been set.

In the first step 10, a main relay (not shown in the figures) is turned on, and then the flow of control proceeds to step 20.

In step 20, the RAM 208 is cleared of all the information stored therein and all the flags are reset to zero, and then the flow of control proceeds to step 30.

In step 30, data are read in with respect to the signal indicative of the rotational speed N of the engine 14 detected by the rotational speed sensor 16, the signal indicative of the temperature T of oil detected by the temperature sensor 195, signals indicative of the pressures Ps and Pd in the high pressure and the low pressure line detected by the pressure sensors 197 and 198, respectively, the signals indicative of the pressures Pi in the working fluid chambers 2FL, 2FR, 2RL and 2RR detected by the pressure sensors 199FL, 199FR, 199RL and 199RR, the signal indicative of whether or not the ignition switch 216 is on, the signals indicative of the vehicle heights Xi detected by the vehicle height sensors 144FL, 144FR, 144RL and 144RR, the signal indicative of the vehicle speed V detected by the speed sensor 234, the signal indicative of the longitudinal acceleration Ga detected by the longitudinal acceleration sensor 236, the signal indicative of the lateral acceleration Gl detected by the lateral acceleration sensor 238, the signal indicative of the steering angle As detected by the steering angle sensor 240, the signal indicative of the yaw rate RYw of the vehicle detected by the yaw rate sensor 242, and the signal indicative of whether the mode of controlling the vehicle height set by the vehicle height setting switch 248 is the high mode or the normal mode, and then the flow of control proceeds to step 40.

In step 40, it is judged if the ignition switch is off. If it is judged that the ignition switch is off, the flow of control proceeds to step 200, whereas if it is judged that the ignition switch is on, the flow of control proceeds to step 50.

In step 50, it is judged if the engine is running based upon whether or not the rotational speed N of the engine detected by the rotational speed sensor 16 and read in in step 30 is higher than a predetermined value. If it is judged that the engine is not running, the flow of control proceeds to step 90, whereas if it is judged that the engine is running, the flow of control proceeds to step 60.

It is to be understood that the judgement with regard to whether or not the engine is running may be made based upon other parameters such as, for example, whether or not the voltage of the electricity generated by an alternator, not shown, driven by the engine is higher than a predetermined value.

In step 60, a timer is started to count the period of time Ts from the time point at which the engine is started to the time point at which the standby pressures Pbi are set for the pressure control means 34, 32, 38 and 36 in step 150 referred to later, and then the flow of control proceeds to step 70. If, however, the timer has already been started, it continues time counting.

Figures 4, 5:
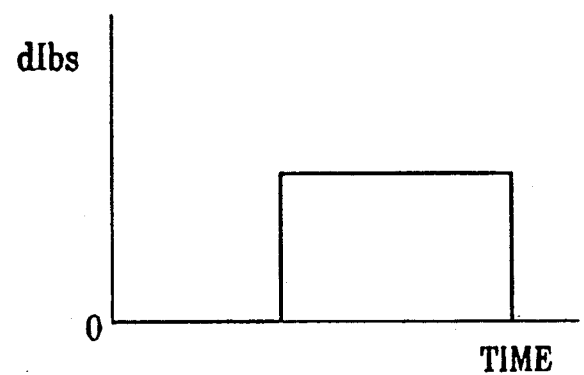
FIG. 4 is a graph showing a map used in calculating the electric current Ib to be supplied to the bypass control means when the active suspension system is being started.
FIG. 5 is a graph showing a relation between the pressures Pi in the working fluid chambers of the actuators and the electric currents Ibi supplied to the pressure control means.

In step 70, an electric current Ib to be supplied to the solenoid 190 in the electromagnetic on-off valve 186 in the bypass control means 196 is calculated according to a map such as the graph shown in FIG. 4 and the following equation and is stored in ROM 206:

$$Ib = Ib + dIbs$$

Then the flow of control proceeds to step 80. In step 80, the electric current Ib calculated in the step 70 is supplied to the solenoid 190 in the electromagnetic on-off valve 186 so as thereby to shift the bypass control means 196 to its fully closed condition, and then the flow of control proceeds to step 90.

In step 90, it is judged whether or not the pressure Ps in the high pressure line is equal to or higher than the threshold value Pc. If it is judged that Ps is not equal to or not higher than Pc, the flow of control proceeds to step 120, whereas if it is judged that Ps is equal to or higher than Pc, the flow of control proceeds to step 100.

In step 100, the flag Fc is set to "1", and then the flow of control proceeds to step 110.

In step 110, as will be described in detail later with reference to FIGS. 6A through 6C and FIGS. 7 through 13, in order to control the comfortability of the vehicle and the attitude of the vehicle body, calculations for the active control are carried out based upon the data read in in step 30 so as to calculate the electric currents Iui to be supplied to the solenoids 78, 58, 82 and 80 incorporated in the variable throttle means 72, 54, 76 and 74 in the pressure control means, and then the flow of control proceeds to step 170.

In step 120, it is judged whether or not the flag Fc is "1". If it is judged that the flag Fc is "1", i.e., the pressure Ps of the oil in the high pressure line has lowered to a level lower than the threshold pressure Pc after it had once been increased to a level equal to or higher than the threshold value, the flow of control proceeds to step 110, whereas if it is judged that the flag Fc is not "1", i.e., the pressure Ps has not yet been increased to a level equal to or higher than the threshold pressure Pc, then the flow of control proceeds to step 130.

In step 130, it is judged whether or not the flag Fs is "1". If it is judged that the flag Fs is "1", the flow of control proceeds to step 170, whereas if it is judged that the flag Fs is not "1", the flow of control proceeds to step 140.

In step 140, it is judged whether or not the time Ts has elapsed. If it is judged that the time Ts has not yet elapsed, the flow of control proceeds to step 170, whereas if it is judged that the time Ts has elapsed, the flow of control proceeds to step 150.

In step 150, the Ts timer is stopped, and the pressures Pi read in in step 30 are stored in the RAM 208 as the standby pressures Pbi, and further the values of the electric currents Ii (i=1, 2, 3 and 4) to be supplied to the solenoids 78, 58, 82 and 80 incorporated in the variable throttle means 72, 54, 76 and 74 in the pressure control means 34, 32, 38 and 36 are calculated based upon the map as shown in FIG. 4 stored in the ROM 206 so that the pressures in the connection lines 84, 56, 88 and 86 between the associated pressure control means and the associated cut-off valves are controlled to the respective standby pressures Pbi, i.e., the pressures which are substantially equal to the pressures Pi in the working fluid chambers 2FL, 2FR, 2RL and 2RR that are detected by the associated pressure sensors, and then the flow of control proceeds to step 160.

In step 160, the flag Fs is set to "1", and then the flow of control proceeds to step 170.

In step 170, it is judged whether or not the electric current Ib calculated in step 70 is not less than a reference value Ibo. If it is judged that the current Ib is less than Ibo, the flow of control is returned to step 30, whereas if it is judged that the current Ib is not less than Ibo, the flow of control proceeds to step 180.

In step 180, it is judged whether or not the pressure Ps in the high pressure line read in in step 30 is not less than a reference value Pso which is lower than the threshold value Pc. If it is judged that Ps is less than Pso, then the flow of control is returned to step 30, whereas if it is judged that Ps is not less than Pso, the flow of control proceeds to step 190.

In step 190, the electric currents Ibi calculated in step 150 or the electric currents Iui calculated in step 110 are supplied to the solenoids 78, 58, 82 and 80 incorporated in the variable throttle means included in the associated pressure control means so that they are operated to adjust the pressures in the working fluid chambers in the associated actuators, and then the flow of control is returned to step 30. Thus, the steps 30 through 190 are repeated.

In step 200, the supply of the electric current to the solenoid 190 in the electromagnetic on-off valve 186 is stopped to open the bypass control means 196, and then the flow of control proceeds to step 210.

In step 210, the main relay is turned off to finish the control flow shown in FIG. 3, and the supply of electricity to the electric control device 200 shown in FIG. 2 is stopped.

It is to be noted that the pressure control conducted by the bypass control means when the system is started forms no essential part of the present invention. For more details in this regard, if desired, reference should be made to Japanese Patent Application 63-307189 assigned to the assignee as the present application. It is also to be understood that the pressure control conducted by the bypass control means for stopping the system may be carried out in the same manner as in the system described in Japanese Patent Application 63-307190 assigned to the same assignee as the present application.

Referring next to the FIGS. 6A through 6C and FIGS. 7 through 13, calculations for the active control conducted in the above-mentioned step 110 will be described.

Figure 7:
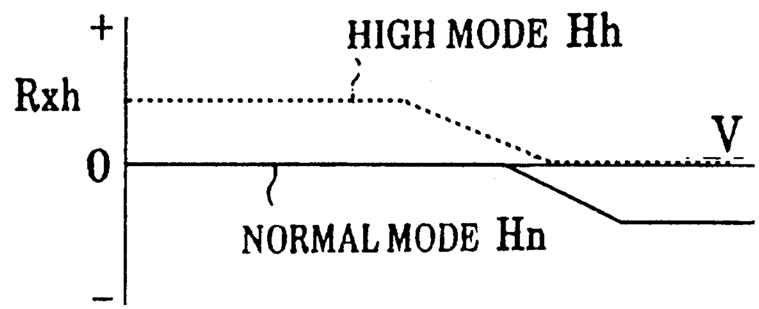
FIG. 7 is a graph showing a relation between vehicle speed V and a target displacement Rxh.
Figure 8:
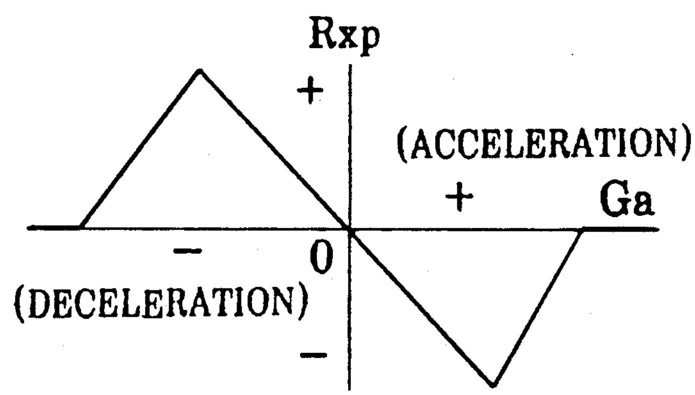
FIG. 8 is a graph showing a relation between longitudinal acceleration Ga and a target displacement Rxp.
Figure 9:
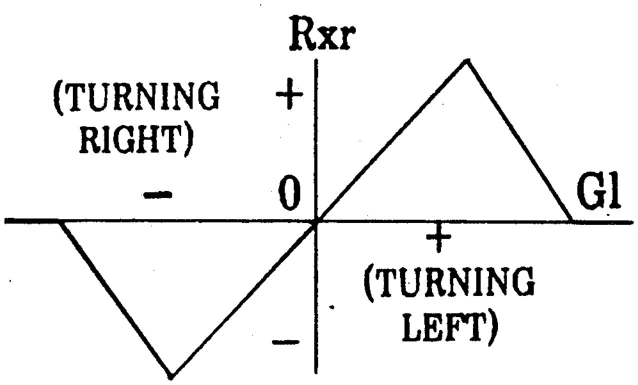
FIG. 9 is a graph showing a relation between lateral acceleration Gl and a target displacement Rxr.

In step 300, based upon maps such as the graphs shown in FIGS. 7 through 9, target values Rxh, Rxp and Rxr for the heave, pitch and roll, respectively, required for attaining a desired attitude of the vehicle body are calculated, and then the flow of control proceeds to step 310.

It is to be noted that in FIG. 7, the solid line shows a normal mode pattern which is set up when the vehicle height setting switch is set to a normal mode and the dotted line shows a high mode pattern which is set up when the vehicle height setting switch is set to a high mode.

In step 310, based upon the vehicle heights $X_1$, $X_2$, $X_3$ and $X_4$ at the front left, front right, rear left, and rear right wheels read in in step 30, calculations for converting the displacements into values of heave "Xxh", pitch "Xxp", roll "Xxr" and warp "Xxw" are carried out according to the following equations, and thereafter the flow of control proceeds to step 320:

$$Xxh=(X_1+X_2)+(X_3+X_4)$$

$$Xxp=-(X_1+X_2)+(X_3+X_4)$$

$$Xxr=(X_1-X_2)+(X_3-X_4)$$

$$Xxw=(X_1-X_2)-(X_3-X_4)$$

In step 320, differences in the respective mode values are calculated according to the following equations, and then the flow of control proceeds to step 330:

$$Exh=Rxh-Xxh$$

$$Exp=Rxp-Xxp$$

$$Exr=Rxr-Xxr$$

$$Exw=Rxw-Xxw$$

In this calculation, Rxw may be zero, or a value of Xxw calculated in step 310 just after the active suspension system has been started up to operate or an average value of Xxw calculated in the last few cycles. If the absolute value of Exw is equal to or less than $W_1$ (a certain positive constant), Exw is set to zero.

In step 330, calculations for PID compensations in a displacement feedback control are conducted according to the following equations, and thereafter the flow of control proceeds to step 340.

$$Cxh=Kpxh \cdot Exh+Kixh \cdot Ixh(n)+Kdxh\{Exh(n)-Exh(n-n_1)\}$$

$$Cxp=Kpxp \cdot Exp+Kixp \cdot Ixp(n)+Kdxp\{Exp(n)-Exp(n-n_1)\}$$

$$Cxr=Kpxr \cdot Exr+Kixr \cdot Ixr(n)+Kdxr\{Exr(n)-Exr(n-n_1)\}$$

$$Cxw=Kpxw \cdot Exw+Kixw \cdot Ixw(n)+Kdxw\{Exw(n)-Exw(n-n_1)\}$$

It should be noted that in the above equations, Ej(n) (j=xh, xp, xr and xw) are the present values of Ej, and $Ej(n-n_1)$ are values of Ej obtained $n_1$ cycles before. Further, denoting Ij(n) and $Ij(n-_1)$ to be the current value of Ij and the value of Ij at the immediately preceding cycle, and Tx to be a time constant, respectively, $$Ij(n)=Ej(n)+Tx\,Ij(n-1)$$

and assuming Ijmax to be a predetermined value, the absolute value of Ij is equal to or smaller than Ijmax. The coefficients Kpj, Kij and Kdj (j=xh, xp, xr and xw) are proportional constants, integration constants and differentiation constants, respectively.

In step 340, calculations for reversal conversion of the displacement modes are carried out according to the following equations, and then the flow of control proceeds to step 350:

$$Px_1 = \frac{1}{4} \cdot Kx_1(Cxh - Cxp - Cxr - Cxw)$$

$$Px_2 = \frac{1}{4} \cdot Kx_2(Cxh - Cxp - Cxr - Cxw)$$

$$Px_3 = \frac{1}{4} \cdot Kx_3(Cxh - Cxp - Cxr - Cxw)$$

$$Px_4 = \frac{1}{4} \cdot Kx_4(Cxh + Cxp - Cxr + Cxw)$$

wherein $Kx_1$, $Kx_2$, $Kx_3$ and $Kx_4$ are proportional constants.

Figure 10:
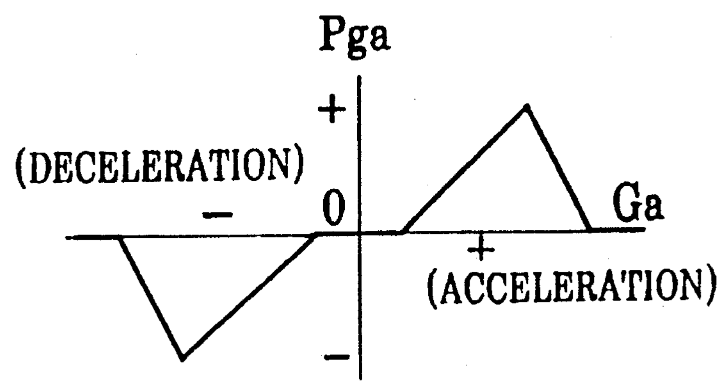
FIG. 10 is a graph showing a relation between longitudinal acceleration Ga and a pressure compensation amount Pga.
Figure 11:
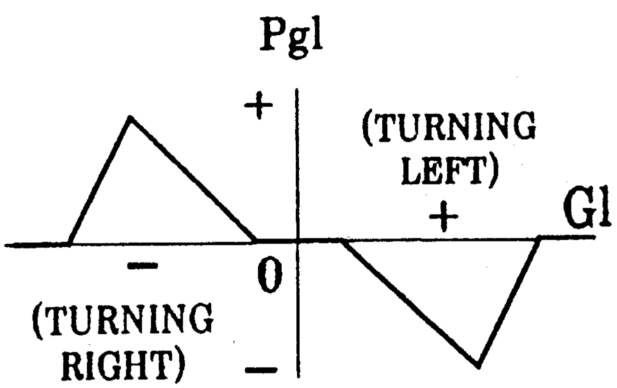
FIG. 11 is a graph showing a relation between lateral acceleration Gl and a pressure compensation amount Pgl.

In step 350, based upon maps such as the graphs shown in FIGS. 10 and 11, pressure compensation values Pga and Pgl in the longitudinal and lateral directions, respectively, are calculated, and then the flow of control proceeds to step 360:

In step 360, calculations for PD compensations for acceleration feedback control are carried out with respect to pitch (Cgp) and roll (Cgr) according to the following equations, and thereafter the flow of control proceeds to step 370:

$$Cgp = Kpgp \cdot Pga + Kdgp\{Pga(n) - Pga(n - n_1)\}$$

$$Cgr = Kpgr \cdot Pgl + Kdgr\{Pgl(n) - Pgl(n - n_1)\}$$

Here Pga(n) and Pgl(n) are present Pga and Pgl, respectively, and $Pga(n-n_1)$ and $Pgl(n-n_1)$ are Pga and Pgl at the cycle which is preceding by $n_1$ cycles the present cycle. Kagp and Kpgr are proportional constants, while Kdgp and Kdgr are differentiation constants.

In step 370, denoting the steering angle read in at step 30 (FIG. 3), at the immediately preceding cycle, as As', steering angle velocity RAs is calculated according to the following equation:

$$RAs = As - As'$$

Figure 12:
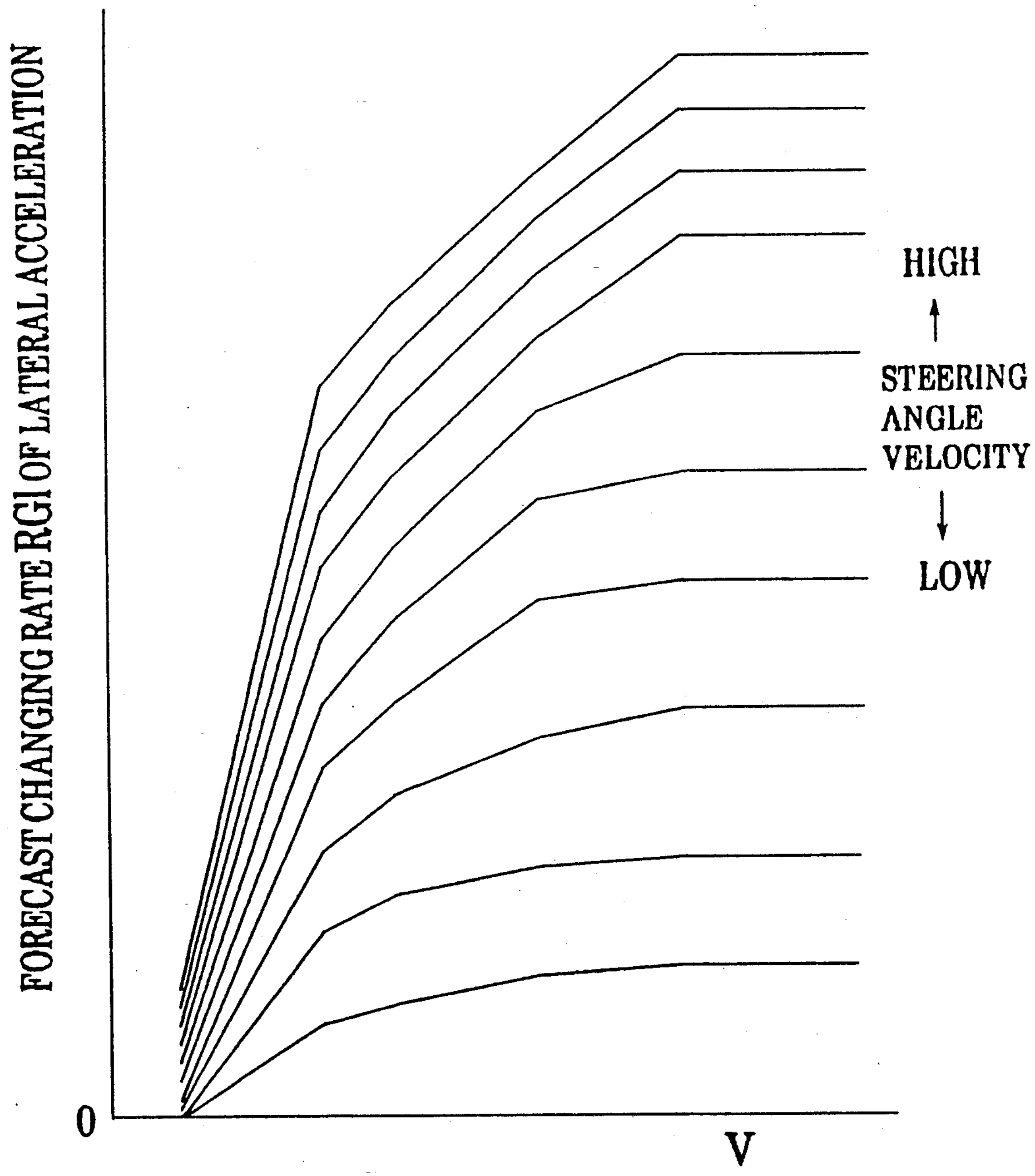
FIG. 12 is a graph showing a relation among vehicle speed V, steering angle velocity RAs and rate of change of the estimated lateral acceleration RGl.

Then based upon a map such as the graph shown in FIG. 12, the steering angle velocity RAs calculated above, and vehicle speed V, an estimated change rate RGl of the lateral acceleration Gl is calculated, and thereafter the flow of control proceeds to the 380.

In step 380, expressing the steering gear ratio by Ng and the wheel base by L, an estimated yaw rate RYw' is calculated according to the following equation:

$$RYw' = VAs.Ng/L$$

In step 385, it is judged if the absolute value of the difference between the actual yaw rate RYw read in in step 30 and the estimated yaw rate RYw' is larger than a standard value d (positive constant), and if the answer is no, the control proceeds to step 400, whereas if the answer is yes the control proceeds to step 390.

In step 390, it is judged if the direction of the lateral acceleration Gl and the direction of the steering angle velocity RAs are opposite to one another, and if the answer is no, the control proceeds to step 400, whereas if the answer is yes, the control proceeds to step 395.

In step 395, gains K1f and K1r for the estimated lateral acceleration in the calculations carried out in the following step 410 are set to K1fl and K1rl which are lower than K1fh and K1rh set in step 400 described hereinunder, respectively. Then the control proceeds to step 410.

In this connection, the gains K1fl and K1rl may be zero.

In step 400, the gains K1f and K1r for the estimated lateral acceleration in the calculations carried out in the following step 410 are set to K1fh and K1rh, respectively, and then the control proceeds to step 410.

In step 410, calculations for reversal conversion of the acceleration modes are carried out according to the following equations, and then the flow of control proceeds to step 420:

$$Pg_1 = Kg_1/4 \cdot (-Cgp + K_2f \cdot Cgr + K_1f \cdot RGl)$$

$$Pg_2 = Kg_2/4 \cdot (-Cgp - K_2f \cdot Cgr - K_1f \cdot RGl)$$

$$Pg_3 = Kg_3/4 \cdot (Cgp + K_2r \cdot Cgr + K_1r \cdot RGl)$$

$$Pg_4 = Kg_4/4 \cdot (Cgp - K_2r \cdot Cgr - K_1r \cdot RGl)$$

In the above equations $Kg_1$, $Kg_2$, $Kg_3$ and $Kg_4$ are proportional constants, and $K_1f$, $K_1r$, $K_2f$ and $K_2r$ are constants for distributing gains between the front and rear vehicle wheels.

In step 420, based upon the pressures Pbi stored in the RAM 208 in step 150 and the results of calculations in steps 340 and 410, target pressures Pui for the pressure control means are calculated according to the following equation, and thereafter the flow of control proceeds to step 430:

$$Pui = Pxi + Pgi + Pbi (i = 1, 2, 3 \text{ and } 4)$$

In the step 430, target electric currents to be supplied to the pressure control means are calculated according to the following equations, and then the flow of control proceeds to step 440:

$$I_1 = Ku_1 \cdot Pu_1 + Kh(Psr - Ps) - Kl \cdot Pd - a$$

$$I_2 = Ku_2 \cdot Pu_2 + Kh(Psr - Ps) - Kl \cdot Pd - a$$

$$I_3 = Ku_3 \cdot Pu_3 + Kh(Psr - Ps) - Kl \cdot Pd$$

$$I_4 = Ku_4 \cdot Pu_4 + Kh(Psr - Ps) - Kl \cdot Pd$$

It is to be noted that $Ku_1$, $Ku_2$, $Ku_3$, $Ku_4$ are proportional constants for the corresponding vehicle wheels; Kh and Kl are compensation coefficients for the pressures in the high pressure and the low pressure lines, respectively; a is a compensation constant between the front and rear vehicle wheels; and Psr is a standard pressure in the high pressure line.

Figure 13:
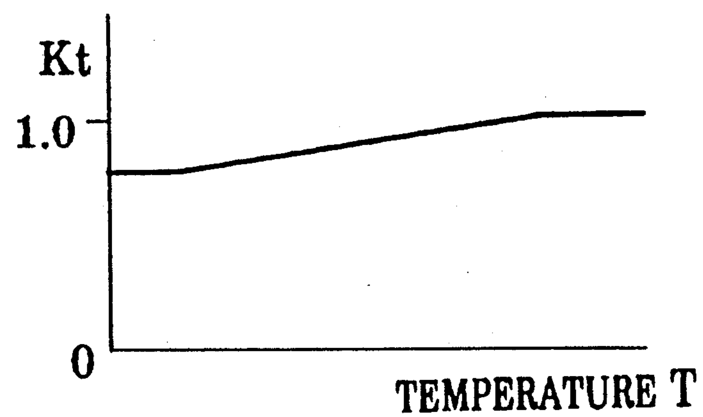
FIG. 13 is a graph showing a relation between temperature T of oil and a compensation coefficient Kt.

In step 440, based upon the temperature T of oil read in in step 30 and the map of the graph shown in FIG. 13, a compensation coefficient Kt for the oil temperature is calculated, and the calculations for compensating the target electric currents with respect to the oil temperature are carried out according to the following equation, and then the flow of control proceeds to step 450:

$$Iti = Kt \cdot Ii (i = 1, 2, 3 \text{ and } 4)$$

In step 450, an electric current for a warping, i.e., a twisting of the vehicle body about the longitudinal axis thereof, is calculated according to the following equation, and thereafter the flow of control proceeds to step 460:

$$Iw = (It_1 - It_2) - (It_3 - It_4)$$

In step 460, denoting the target electric current value for warping as Riw, a difference of the electric current for warping from the target value therefor is calculated according to the following equation, and then the flow of control proceeds to step 470:

$$Eiw = Riw - Iw$$

In the above equation the target electric current value for warping Riw may be zero.

In step 470, employing a proportional constant Kiwp, a target control value of the electric current for warping is calculated according to the following equation, and then the flow of control proceeds to step 480:

$$Eiwp = Kiwp \cdot Eiw$$

In step 480, calculations for reversal conversion of the electric current for warping are carried out according to the following equations, and thereafter the flow of control proceeds to step 490:

$$Iw_1 = Eiwp/4$$

$$Iw_2 = -Eiwp/4$$

$$Iw_3 = -Eiwp/4$$

$$Iw_4 = Eiwp/4$$

In step 490, based upon the values obtained by the calculations conducted in steps 440 and 480, final target electric currents Iui to be supplied to the pressure control means are calculated according to the following equation, and then the flow of control proceeds to the step 170 shown in FIG. 3.

$$Iui = Iti + Iwi (i = 1, 2, 3 \text{ and } 4)$$

Thus, according to the above-described embodiment, an estimated yaw rate is calculated in step 380, and is compared with the actual yaw rate in step 385. Then, if the absolute value between these two values is greater than a predetermined value, it is determined that the vehicle has made a side sliding. In this case, it is checked if the directions of the lateral acceleration Gl and the steering angle velocity RAs are opposite to one another in step 390, and if the answer is yes, it is detemined that a counter steering has been done, and then the gains K1f and K1r for the rate of change of the estimated lateral acceleration are set to certain low values therefor in step 395 so that the amount of roll control based upon the rate of change of the lateral acceleration is decreased, thus avoiding that the rolling is augmented by the roll control when a counter steering has been done.

Further, according to the shown embodiment, since the roll control based upon the detected lateral acceleration Gl is continued even when a counter steering has been detected, the vehicle body during turning is controlled in good posture.

Although the present invention has been described in detail with respect to a particular embodiment thereof, it will be clear to those skilled in the art that the present invention is not limited to this embodiment and various modifications are possible within the scope of the present invention.

For example, the side sliding of the vehicle may be detected by other methods or means such as a comparison of a lateral acceleration estimated from the steering angle or the vehicle speed and the steering angle with an actual lateral acceleration, or a comparison of a yaw rate estimated from the steering angle or the vehicle speed and the steering angle with the actual yaw rate.

I claim:

1. A roll control system in a vehicle, comprising: a means for detecting a side sliding of the vehicle relative to a road surface during steering of the vehicle, a means for detecting or estimating lateral acceleration of a vehicle body, a means for detecting vehicle speed, a means for determining steering angle velocity, a means for estimating rate of change of the lateral acceleration of the vehicle body from vehicle speed and steering angle velocity, a means for detecting direction of the steering angle velocity, a roll stiffness control means for controlling stiffness against rolling of the vehicle body at each of front and rear wheels, and a means for controlling said roll stiffness control means based upon the estimated rate of change of the lateral acceleration so as to increase the stiffness against rolling of the vehicle body along with an increase of the estimated rate of change of the lateral acceleration, wherein said means for controlling said roll stiffness control means is adapted to attenuate said increase of the stiffness against rolling of the vehicle body when the side sliding is detected and the directions of the lateral acceleration and the steering angle velocity are determined to be opposite to one another.

2. A roll control system according to claim 1, wherein said roll stiffness control means is an active suspension of the vehicle having fluid actuators each controlling a load to be supported at each one of vehicle wheels of the vehicle, said load at each vehicle wheel being determined in reference to relative vehicle heights between respective ones of the vehicle wheels and the lateral acceleration of the vehicle body, said attenuation of the increase of the stiffness against rolling of the vehicle body being effected by a modification of a factor in said reference to the lateral acceleration in the determination of the load supported by each said actuator.

3. A roll control system according to claim 2, wherein said factor is modified by reducing the importance of the lateral acceleration in said determination of the load supported by each said actuator.

4. A roll control system in a vehicle, comprising:

a means for detecting steering angle;

a means for detecting vehicle speed;

a means for calculating an estimated yaw rate based upon the steering angle and the vehicle speed;

a means for detecting an actual yaw rate;

a means for detecting a side sliding of the vehicle relative to a road surface during steering of the vehicle based upon the estimated yaw rate and the actual yaw rate;

a means for detecting or estimating lateral acceleration of a vehicle body;

a means for calculating a steering angle velocity;

a means for estimating rate of change of the lateral acceleration of the vehicle body from the vehicle speed and the steering angle velocity;

a roll stiffness control means for controlling stiffness against rolling of the vehicle body at each of front and rear wheels; and a means for controlling said roll stiffness control means based upon the estimated rate of change of the lateral acceleration so as to increase the stiffness against rolling of the vehicle body along with increase of the estimated rate of change of the lateral acceleration, wherein said means for controlling said roll stiffness control means is adapted to attenuate said increase of the stiffness against rolling of the vehicle body when the side sliding is detected and the directions of the lateral acceleration and the steering angle velocity are determined to be opposite to one another.

* * * * *